United States Patent
Whitehead, Sr.

[11] Patent Number: 6,086,128
[45] Date of Patent: Jul. 11, 2000

[54] PASSENGER COMPARTMENT DIVIDER FOR A MOTOR VEHICLE

[76] Inventor: Michael T. Whitehead, Sr., 8610 S. Normandy, Burbank, Ill. 60459

[21] Appl. No.: 09/149,788

[22] Filed: Sep. 8, 1998

[51] Int. Cl.[7] .................................................. B60P 3/05
[52] U.S. Cl. ........................................ 296/24.1; 160/354
[58] Field of Search ................................ 296/24.1, 166; 160/40, 354, 370.21; 52/24.1

[56] References Cited

U.S. PATENT DOCUMENTS

| | | | |
|---|---|---|---|
| 3,166,116 | 1/1965 | Cole | 160/370.21 |
| 3,214,211 | 10/1965 | Setina | 296/24.1 |
| 3,353,309 | 11/1967 | Kwake | 52/2.14 |
| 3,547,217 | 12/1970 | Garaza | 296/24.1 |
| 3,632,154 | 1/1972 | Woodrich | 296/24.1 |
| 3,810,262 | 5/1974 | Strand | 52/2.14 |
| 3,931,994 | 1/1976 | Palmiter | 296/24.1 |
| 4,095,837 | 6/1978 | Hunter | 296/24.1 |
| 4,366,977 | 1/1983 | Davis et al. | 296/24 R |
| 4,621,856 | 11/1986 | McKenzie | 296/24.1 |
| 4,708,384 | 11/1987 | La Rosa | 296/24 R |
| 4,938,518 | 7/1990 | Willemsen | 296/24.1 |
| 4,971,378 | 11/1990 | Setina | 296/24.1 |
| 5,058,941 | 10/1991 | Solomon et al. | 296/24.1 |
| 5,207,260 | 5/1993 | Commesso | 160/135 |
| 5,207,722 | 5/1993 | Lee | 296/24.1 |
| 5,238,282 | 8/1993 | Watson et al. | 296/24.1 |
| 5,246,261 | 9/1993 | McCormack | 296/24.1 |
| 5,382,068 | 1/1995 | Simmons et al. | 296/24.1 |
| 5,511,842 | 4/1996 | Dillon | 296/24.1 |
| 5,529,363 | 6/1996 | Borowski | 296/24.1 |
| 5,536,057 | 7/1996 | Stewarrt | 296/24.1 |
| 5,845,697 | 12/1998 | Zheng | 160/370.21 |

*Primary Examiner*—Joseph D. Pape
*Assistant Examiner*—Kiran Patel
*Attorney, Agent, or Firm*—Joseph N. Breaux

[57] ABSTRACT

A passenger compartment divider for a motor vehicle comprising a substantially flexible barrier. A flexible frame extends about perimeter of the barrier. An air-filled support cushion surrounds the flexible frame. A facility is for inflating the support cushion. When the barrier with the flexible frame is positioned vertically behind front seats of the passenger compartment in the motor vehicle and the support cushion is filled by the inflating facility, a seal is produced to make a secure fit between the rear portion and front portion of the passenger compartment, to allow the front seat area to heat or cool in less than half of the normal time required.

6 Claims, 2 Drawing Sheets

PASSENGER COMPARTMENT DIVIDER FOR A MOTOR VEHICLE

TECHNICAL FIELD

The present invention relates to temporary partitions for vehicles and more particularly to a passenger compartment divider for a motor vehicle. The passenger compartment divider for a motor vehicle seals off the rear portion of the passenger compartment and allows an air conditioner to cool off just the front portion of the passenger compartment. The divider includes a substantially transparent flexible barrier panel with a length of flex-wire thereabout surrounded by an inflatable bladder having an inflation hose that is engageable with a cup-like fitting that fits over the air conditioner exhaust vent.

BACKGROUND ART

Numerous temporary partitions for vehicles have been provided in prior art. For example, U.S. Pat. Nos. 4,095,837 to Hunter; 4,366,977 to Davis et al.; 4,621,856 to McKenzie; 4,708,384 to LaRosa; 4,938,518 to Willemsen; 4,971,378 to Setina; 5,058,941 to Solomon et al.; 5,207,260 to Commesso; 5,207,722 to Lee; 5,238,282 to Watson et al.; 5,246,261 to McCormack; and 5,382,068 to Simmons et al. all are illustrative of such prior art. While these units may be suitable for the particular purpose to which they address, they would not be as suitable for the purposes of the present invention as heretofore described.

The Hunter U.S. Pat. No. 4,095,837 discloses an air partition for automobile passenger compartments. A partition for segregating the air space within the passenger compartment of an automobile or the like relative to the passenger seats thereof including an elongated upper support track for affixment to the inner roof portion of an automobile, a plurality of side brackets for removable affixment to the opposed inner wall portions of the automobile, and a transparent curtain secured on the free lateral edges thereof to the plurality of side brackets, and on the uppermost free edge thereof to the upper support track.

The Davis et al. U.S. Pat. No. 4,366,977 discloses a partition for a cargo transporter. A removable and movable partition for dividing up the interior of a cargo transporter has a boundary made up of mutually perpendicular inflatable tube sections which rigidify upon inflation and urge themselves tightly into contact with the walls, floor and ceiling respectively of the transporter. The inflation of the tubes also tensions between them a double dividing wall, of two parallel sheets of flexible material which are respectively secured tangentially to the tubes, and which may have a flap for access to inflation/deflation valves. Shaped spacer means may be interposed between the tube(s) and floor and ceiling if they are corrugated or otherwise interrupted.

The McKenzie U.S. Pat. No. 4,621,856 discloses a mountable and demountable partition structure for motor vehicles. A mountable and demountable partition structure for motor vehicles, such as vans and station wagons, is provided. The partition comprises a panel which is adapted to extend substantially from top to bottom and from side to side of the vehicle, where it is mounted; and is mounted by fastener means extending downwardly through brackets at the bottom edge of the panel into plates secured in the floor of the vehicle, and through brackets at the top of the panel into tracks mounted between roof ribs in the roof of the vehicle. The panel comprises three panel portions, each of which extends across the width of the panel, where the upper panel portion is tilted forwardly from the vertical, and the lower portion is tilted rearwardly from the vertical, when mounted. The overall configuration of the panel is that of a forwardly bowed panel; and at least the upper and middle panel portions of the panel are made of a solid, translucent material such as sheet polycarbonate, thereby providing a clear, glare-free and unobstructed rearwards view for the driver of the vehicle. Because of its bowed configuration, the partition provides additional safety to the occupants of the vehicle in the event that a forwardly moving object strikes the partition, as in the event of a collision when passengers or cargo are not secured in the rear of the vehicle. The partition provides for energy efficiency by permitting greater loading of the cargo compartment of the vehicle, as well as maintaining heating or air conditioning effects to the passenger compartment of the vehicle.

The LaRosa U.S. Pat. No. 4,708,384 discloses a protective automobile partition. In a protective automobile separator, a screen like divider to be installed between the front and rear seats. L-shaped brackets secure the divider to the inner walls of the automobile. The L-shaped brackets have centrally located longitudinal slots through which is bolted an adaptor bar which runs along side the divider. The longitudinal slots allow the adaptor bar to be placed at a predetermined location between the divider and the inner wall of the automobile in order to prevent a passenger from reaching around the separator.

The Willemsen U.S. Pat. No. 4,938,518 discloses a vehicle partition assembly. The invention serves as a thermal barrier between the passenger compartment and the cargo area of a vehicle to be used to transport cargo, enabling elongated objects to be stored along the entire internal length of the vehicle, while at the same time enabling the driver of the vehicle to have a clear and unobstructed view of the rear window of the vehicle. The assembly is mounted across the width of a vehicle and is secured across the top of the vehicle. The assembly includes a cross member, a viewing means, and a suspended thermal barrier. The thermal barrier comprises a plurality of flexible transparent strips which form a curtain. The flexible strips extend substantially to the floor of the vehicle, in an overlapping relationship with each adjacent strip.

The Setina U.S. Pat. No. 4,971,378 discloses a pivoted automobile partition with adjustable spring bias. A pivoted automobile partition is described including an adjustable spring bias means for adjusting the force of a coil spring which pivots the partition from a lowered position to a raised position. The adjustment means includes a threaded pivot shaft which is connected to one end of the coil spring and is adjusted into different rotational positions to change the tension of such spring. The pivot shaft is fixed in its adjusted position to a pivot arm on the partition by lock nuts. A tubular housing and plastic cover sleeve completely enclose the spring bias means, so that it cannot be tampered with and cannot injure rear seat passengers.

The Solomon et al. U.S. Pat. No. 5,058,941 discloses a vehicle interior barrier. A barrier for partitioning the front and rear seat compartments in a motor vehicle is disclosed. The barrier includes a transparent wall dimensioned to approximate the cross-sectional area of the vehicle interior at a location behind the front seat. The wall has a pocket for printed matter in its lower half, and one or more light refracting channels can be located in the wall. A frame encloses one or more edges of the wall and includes an elongate channel section containing one or more electrical lights. The barrier can be installed, for example, in a taxi cab, and electricity supplied to illuminate printed matter placed in the pocket of the wall.

The Commesso U.S. Pat. No. 5,207,260 discloses an adjustable restrain system for articles. The present invention relates to an adjustable restraint system for confining articles within a desired space in a storage compartment such as an automobile trunk. One embodiment of the restraint system includes at least two posts positioned within the storage compartment and a piece of fabric secured to one of the posts for defining the store space. The system further includes a fastener for maintaining the fabric in a taut condition and thereby preventing movement of the articles within the storage compartment. The posts are preferably adjustable in height, so that the system of the present invention may be used in different dimensioned storage compartments. In another embodiment of the present invention, multiple posts and multiple pieces of fabric are used to form multiple article storage spaces.

The Lee U.S. Pat. No. 5,207,722 discloses a partition for air-conditioned vehicle. For the purpose of achieving more efficient control of the interior temperature of front half of a passenger vehicle, this invention discloses an attachable and detachable transparent partition mounted on rear side window panes across the mid section behind front seats. One version of the embodiment is applicable to two door vehicles with fixed rear side window panes. Another version applicable to four door vehicles does not interfere with opening and closing operations of rear doors.

The Watson et al. U.S. Pat. No. 5,238,282 discloses a vehicle interior partition. This invention relates to accessories for automobiles, vans, aircraft, minivans and station wagons and in particular to an improved partition comprised of a main support beam which requires no permanent attachment to the vehicle in which it is installed and from which is suspended generally from the roof to the floor transparent, semi-transparent or opaque curtain panels whose primary purpose is to substantially confine heated or cooled air or air containing smoke to a specific area of the vehicle. The device is adjustable, requiring no permanent alterations to fit the interior of a very large variety of vehicles of different descriptions, can be collapsed and folded while not in use and remains intact while being portable and can be installed anywhere along the length of a vehicle interior where trim molding, flanges or extrusions of vehicle components or door hardware exists.

The McCormack U.S. Pat. No. 5,246,261 discloses a safety partition for motor vehicles. A one piece partition for the interior of van type vehicles molded of plastic material and extending transversely from side to side and from the roof to the floor with the partition being positioned directly behind the driver and passenger seats to give maximum cargo space in the rear compartment of the vehicle. A console extends forwardly from the partition into the forward compartment between the driver's and passenger's seats and opens rearwardly to elongate the storage space offered by the rear compartment. The entire perimeter of the partition and the bottom of the console is in close proximity to vehicle portions so installation is made by attaching means such as double sided tape fixed to the perimeters and to the adjacent vehicle portions to form a thermal and safety barrier between the compartments.

The Simmons et al. U.S. Pat. No. 5,382,068 discloses an easily installed flexible barrier for vans. A form fitting flexible sheet van barrier wall is held in place by reusable adhesive strips as a dust sealing thermal barrier for mounting behind the driver compartment of a van to divide the van into driving and working compartments. The sheet may be rolled up and stored adjacent the van roof. The flexible sheet carries a window which may be opened to permit the flow of air between the compartments. Also weight bearing accessories are provided on the sheet for storing items such as coat hangers and work tools. The barrier comes in an assembly manually retrofittable to vans without tooling or van modification.

GENERAL SUMMARY DISCUSSION OF INVENTION

The passenger compartment divider for a motor vehicle consists of a rectangular panel of transparent mesh surrounded by a length of flex-wire. Surrounding the flex-wire is an inflatable bladder which provides a flexible seal for the passenger compartment divider when in use. An inflation hose with an adapter for different air conditioner vent sizes is connected to the bladder, so that the air conditioner can act as an air pump.

A primary object of the present invention is to provide a passenger compartment divider for a motor vehicle that will overcome the shortcomings of the prior art devices.

Another object is to provide a passenger compartment divider for a motor vehicle that is a device to split the interior of the motor vehicle into two separate compartments, so as to allow the front seat area to heat or cool in less than half of the normal time required.

An additional object is to provide a passenger compartment divider for a motor vehicle that is a lightweight, transparent panel with an inflatable bladder about its perimeter to produce a secure fit between the rear and front portions of the passenger compartment.

A further object is to provide a passenger compartment divider for a motor vehicle that is simple and easy to use.

A still further object is to provide a passenger compartment divider for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

Similar reference characters denote corresponding features consistently throughout the attached drawings.

EXEMPLARY MODE FOR CARRYING OUT THE INVENTION

Figure 1:
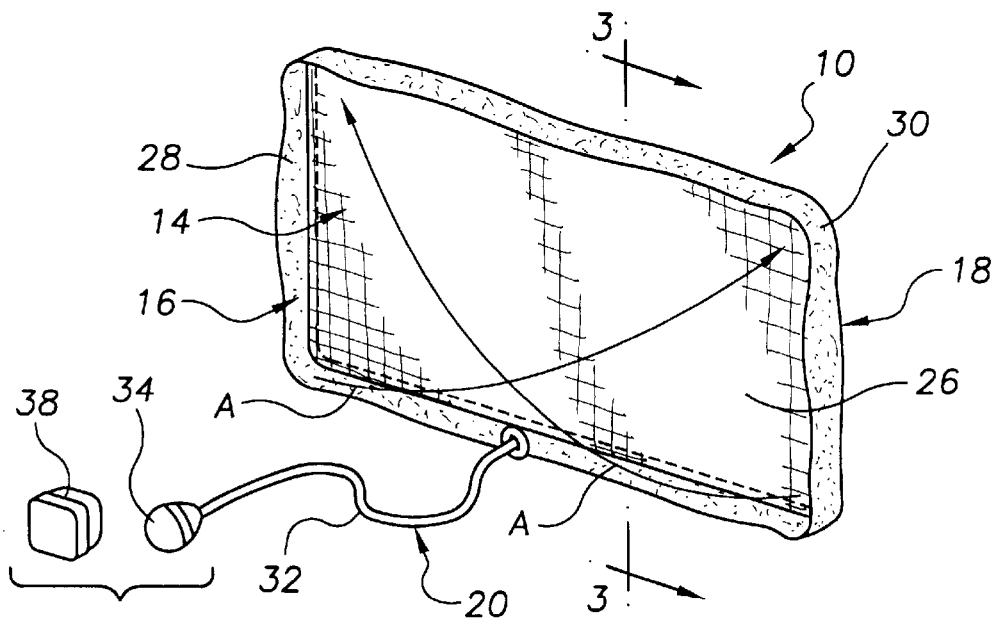
FIG. 1 is a perspective view of the present invention.
Figure 2:
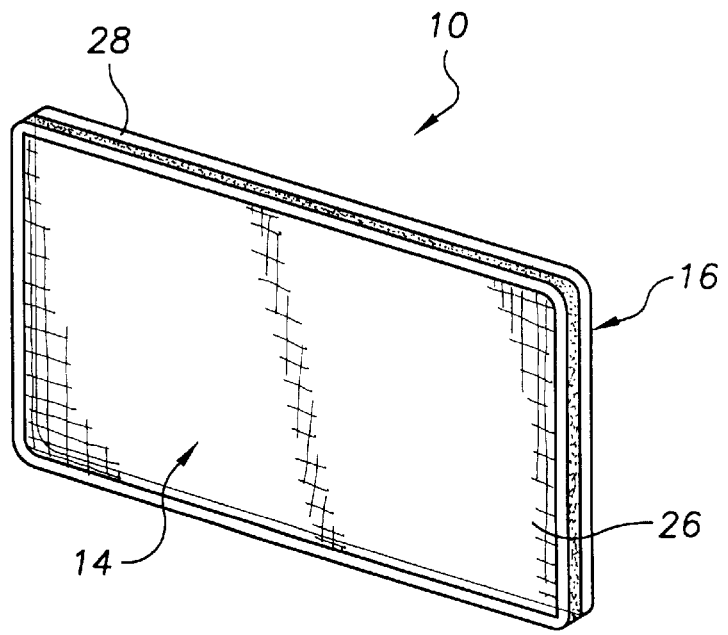
FIG. 2 is a perspective view of the transparent mesh panel surrounded by the flex-wire frame with the inflatable bladder removed therefrom.
Figure 3:
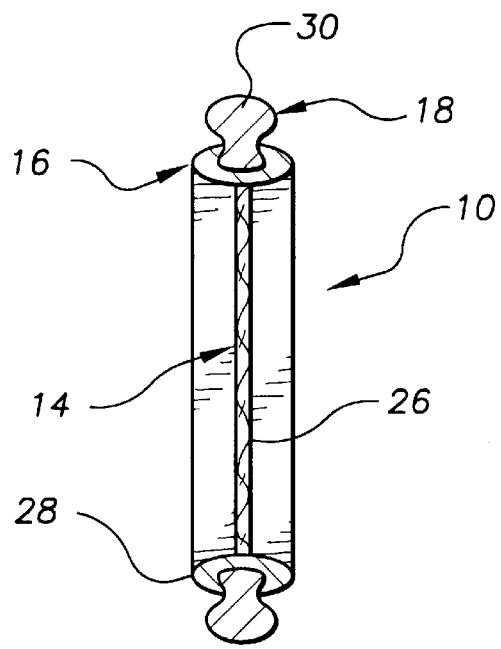
FIG. 3 is a diagrammatic cross sectional view taken along line 3—3 in FIG. 1.
Figure 4:
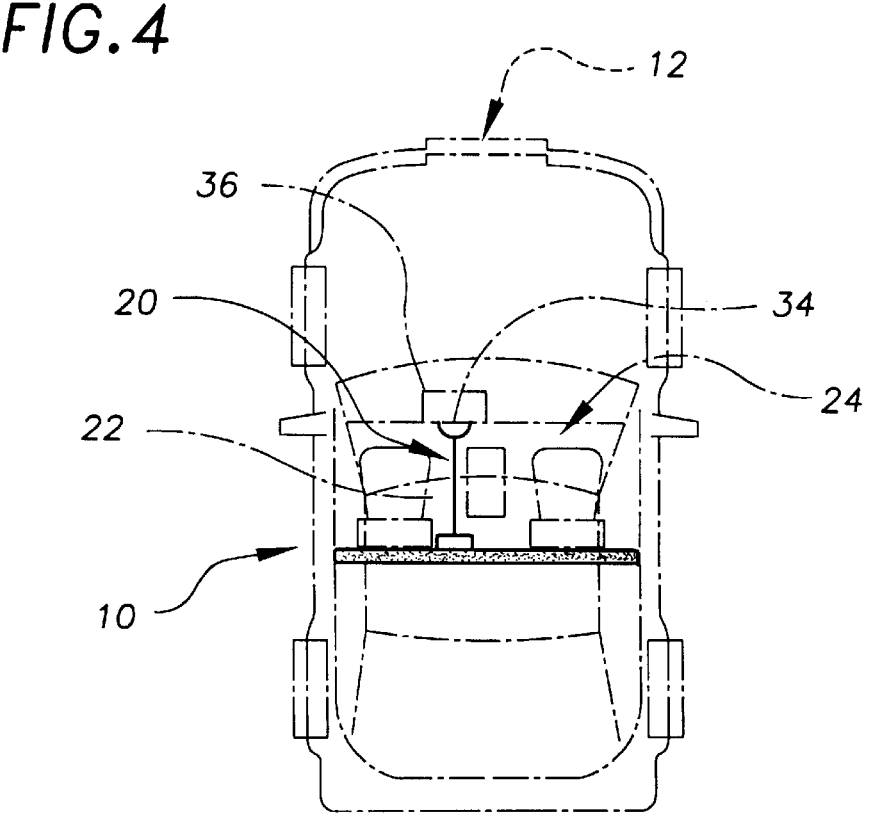
FIG. 4 is a top plan view of a motor vehicle in phantom, showing location of the present invention therein.

Turning now descriptively to the drawings, in which similar reference characters denote similar elements throughout the several views, FIGS. 1 through 4 illustrate the various features of the present invention being a passenger compartment divider 10 for a motor vehicle 12 comprising a substantially flexible barrier 14. Flexible frame 16 extends about perimeter of barrier 14. An air-filled support cushion 18 surrounds flexible frame 16. A facility 20 is for inflating support cushion 18. When barrier 14 with flexible frame 16 is positioned vertically behind front seats 22 of the passenger compartment 24 in the motor vehicle 12 and support cushion 18 is filled by inflating facility 20, a seal is produced to make a secure fit between the rear portion and front portion of the passenger compartment 24, to allow the front seat area to heat or cool in less than half of the normal time required.

Substantially, flexible barrier 14 is a generally rectangular panel 26 of transparent mesh material. Panel 26 can be twisted and opposite corners aligned for storage when not in use, as indicated by arrows A in FIG. 1. Flexible frame 16 is a rubber coated flex-wire 28, while air-filled support cushion 18 is an inflatable bladder 30.

The inflating facility 20, as best seen in FIG. 1, includes an inflation hose 32 extending from air-filled support cushion 18. A cup-like fitting 34 on free end of inflation hose 32 fits over an air conditioner exhaust vent 34, so that the air conditioner 36 in the motor vehicle 12 can act as an air pump. The inflating facility 20 further contains an adapter 38 which engages the cup-like fitting 34 on free end of inflation hose 32, so that adapter 38 will fit different sized air conditioner exhaust vents 34.

It can be seen from the preceding description that in use, the user would extend the panel 26 and mount it behind the front seats 22 of the motor vehicle 12. Once mounted, the user would bend the panel 26 to provide a secure fit, then inflate the surrounding bladder 30 by holding the adapter 38 up to the air conditioner exhaust vent 34 to create a seal between the front and rear portions of the passenger compartment 24. Once in place the passenger compartment divider 10 would serve to seal off the front and rear portions of the passenger compartment 24, allowing hot or cold air produced by the motor vehicle's environmental controls to fill only the front portion of the passenger compartment 24, decreasing the time required for vehicular comfort while helping to save fuel and wear on the heater or air conditioner fan, etc.

It is noted that the embodiment of the passenger compartment divider for a motor vehicle described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A passenger compartment divider for a motor vehicle comprising:

a substantially flexible barrier;

a flexible frame extending about perimeter of said barrier;

an air-filled support cushion surrounding said flexible frame; and means for inflating said support cushion, so that when said barrier with said flexible frame is positioned vertically behind front seats of the passenger compartment in the motor vehicle and said support cushion is filled by said inflating means, a seal is produced to make a secure fit between the rear portion and front portion of the passenger compartment, to allow the front seat area to heat or cool in less than half of the normal time required.

2. The passenger compartment divider for a motor vehicle as recited in claim 1, wherein:

said substantially flexible barrier is a generally rectangular panel of transparent mesh material, so that said panel can be twisted and opposite corners aligned for storage when not in use.

3. The passenger compartment divider for a motor vehicle as recited in claim 1, wherein:

said flexible frame is a rubber coated flex-wire.

4. The passenger compartment divider for a motor vehicle as recited in claim 1 wherein:

said air-filled support cushion is an inflatable bladder.

5. The passenger compartment divider for a motor vehicle as recited in claim 1 wherein:

said inflating means includes an inflation hose extending from said air-filled support cushion and a cup-like fitting on free end of said inflation hose that fits over an air conditioner exhaust vent, so that the air conditioner in the motor vehicle can act as an air pump.

6. The passenger compartment divider for a motor vehicle as recited in claim 5, wherein:

said inflating means further includes an adapter which engages said cup-like fitting on free end of said inflation hose, so that said adapter will fit different sized air conditioner exhaust vents.

* * * * *